United States Patent
Wiederin et al.

(10) Patent No.: US 11,519,521 B1
(45) Date of Patent: Dec. 6, 2022

(54) VALVE HAVING INTEGRATED SENSOR AND STABILIZED ELECTRICAL CONNECTION

(71) Applicant: Elemental Scientific, Inc., Omaha, NE (US)

(72) Inventors: Daniel R. Wiederin, Omaha, NE (US); Brad Prucha, Omaha, NE (US); Jeremiah Meints, Elkhorn, NE (US); Jonathan Hein, Elkhorn, NE (US)

(73) Assignee: Elemental Scientific, Inc., Omaha, NE (US)

( * ) Notice: Subject to any disclaimer, the term of this patent is extended or adjusted under 35 U.S.C. 154(b) by 787 days.

(21) Appl. No.: 16/418,477

(22) Filed: May 21, 2019

Related U.S. Application Data

(60) Provisional application No. 62/674,101, filed on May 21, 2018.

(51) Int. Cl.
  *F16K 37/00* (2006.01)
  *G01N 35/10* (2006.01)
  *F16K 11/074* (2006.01)

(52) U.S. Cl.
  CPC .......... *F16K 37/005* (2013.01); *F16K 11/074* (2013.01); *F16K 37/0058* (2013.01); *G01N 35/1016* (2013.01)

(58) Field of Classification Search
  CPC ............ G01N 30/20; G01N 2030/201; G01N 2030/202; G01N 35/1009; G01N 35/1016; G01D 11/245; F16K 11/074; F16K 37/005; F16K 37/0058
  See application file for complete search history.

(56) References Cited

U.S. PATENT DOCUMENTS

| | | | |
|---|---|---|---|
| 2015/0000515 A1* | 1/2015 | Sobolewski | F15B 15/06 92/33 |
| 2015/0377658 A1* | 12/2015 | Landis | G01D 11/245 439/660 |
| 2016/0201827 A1* | 7/2016 | Tower | F16K 99/0034 137/315.11 |

* cited by examiner

*Primary Examiner* — Benjamin R Schmitt
(74) *Attorney, Agent, or Firm* — Kevin E. West; Advent, LLP

(57) ABSTRACT

Rotary valve systems with integrated sensors are described that facilitate stabilizing electrical connection from a valve actuator. A valve system embodiment includes, but is not limited to, a multi-port rotary valve; an actuator attached to the multi-port rotary valve, wherein the actuator comprises a power connection fed from electronics associated with the actuator; an actuator cap attached to the actuator, the actuator cap configured to allow the power connection to pass through; a valve collar with an integrated press-on connector, wherein the valve collar comprises an electronic feedthrough passage for the power connection; and a retainer portion comprising two retainer pins, wherein the two retainer pins are configured to mate with apertures on the actuator cap, the retainer portion configured to allow electrical connection between the power connector and a sensor connector when the two retainer pins fit within the two apertures on the actuator cap.

15 Claims, 9 Drawing Sheets

VALVE HAVING INTEGRATED SENSOR AND STABILIZED ELECTRICAL CONNECTION

CROSS-REFERENCE TO RELATED APPLICATIONS

The present application claims the benefit under 35 U.S.C. § 119(e) of U.S. Provisional Application Ser. No. 62/674,101 filed May 21, 2018 and titled "VALVE HAVING INTEGRATED SENSOR AND STABILIZED ELECTRICAL CONNECTION," which is herein incorporated by reference in its entirety.

BACKGROUND

Inductively Coupled Plasma (ICP) spectrometry is an analysis technique commonly used for the determination of trace element concentrations and isotope ratios in liquid samples. ICP spectrometry employs electromagnetically generated partially ionized argon plasma which reaches a temperature of approximately 7,000K. When a sample is introduced to the plasma, the high temperature causes sample atoms to become ionized or emit light. Since each chemical element produces a characteristic mass or emission spectrum, measuring the spectra of the emitted mass or light allows the determination of the elemental composition of the original sample.

Sample introduction systems may be employed to introduce the liquid samples into the ICP spectrometry instrumentation (e.g., an Inductively Coupled Plasma Mass Spectrometer (ICP/ICP-MS), an Inductively Coupled Plasma Atomic Emission Spectrometer (ICP-AES), or the like) for analysis. For example, a sample introduction system may withdraw an aliquot of a liquid sample from a container and thereafter transport the aliquot to a nebulizer that converts the aliquot into a polydisperse aerosol suitable for ionization in plasma by the ICP spectrometry instrumentation. The aerosol is then sorted in a spray chamber to remove the larger aerosol particles. Upon leaving the spray chamber, the aerosol is introduced into the plasma by a plasma torch assembly of the ICP-MS or ICP-AES instruments for analysis.

SUMMARY

Rotary valve systems with integrated sensors are described that facilitate stabilizing electrical connection from a valve actuator. In an embodiment of the disclosure, a valve system can include a rotary valve including one or more ports configured to receive one or more fluids, such as a multi-port rotary valve. The valve system further includes an actuator attached to the rotary valve, wherein the actuator includes a power connection fed from electronics associated with the actuator. An actuator cap can be attached to the actuator, where the actuator may further include one or more apertures that allow the power connection to pass through. The valve system can further include a valve collar with an integrated press-on connector that can be attached to the actuator cap. The valve collar may further include an electronic feedthrough passage for the power connection. The valve system can further include a retainer portion including one or more retainer pins. The retainer pins mate with the one or more apertures on the actuator cap, where the retainer portion may allow electrical connection between the power connector and a sensor connector when the retainer pins fit within the one or more apertures on the actuator cap. The valve system may further include a sensor housing adjacent to the rotary valve. The sensor housing may be configured to support multiple sensors disposed with respect to fluid lines coupled to the one or more ports of the rotary valve. The sensor connector may be configured to transmit signals from the one or more sensors to the actuator to perform actions, such as, rotating the valve to a different orientation when fluid is indicated at a certain location within the valve.

In another embodiment of the disclosure, a method may be disclosed. The method may include receiving a first signal from a first sensor when a sample loading of a sample via a rotary valve is initiated. The method may further include receiving a second signal from a second sensor when a sample loop in fluid communication with the rotary valve is completely filled with the sample. The first sensor and the second sensor may be supported in a sensor housing adjacent to the rotary valve. The method may further include injecting the sample into an analysis system, based at least in part on the first signal and the second signal.

In another embodiment of the disclosure, a valve system can include a rotary valve including one or more ports configured to receive one or more fluids, such as a multi-port rotary valve. The valve system further includes an actuator attached to the rotary valve, wherein the actuator includes a power connection fed from electronics associated with the actuator. An actuator cap can be attached to the actuator, where the actuator cap can be configured to allow the power connection to pass through. The actuator cap may include one or more apertures. The valve system can further include a valve collar with an integrated press-on connector that can be configured to be attached to the actuator cap. The valve collar may further include an electronic feedthrough passage for the power connection. The valve system can further include a retainer portion including one or more retainer pins. The retainer pins are configured to mate with the one or more apertures on the actuator cap, where the retainer portion may be configured to allow electrical connection between the power connector and a sensor connector when the retainer pins fit within the apertures on the actuator cap.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures. The use of the same reference numbers in different instances in the description and the figures may indicate similar or identical items.

DETAILED DESCRIPTION

Overview

Figure 1:
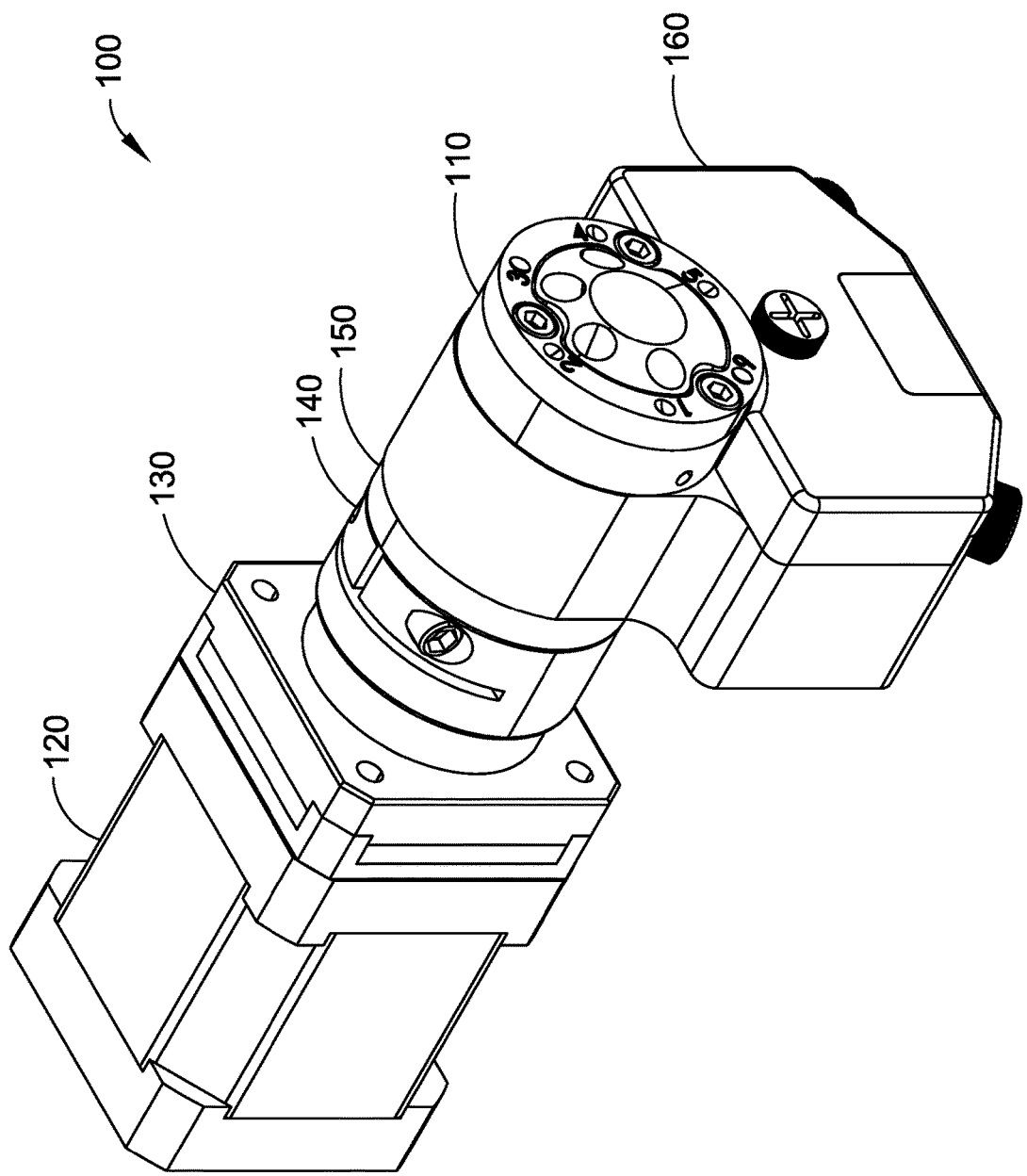
FIG. 1 is an isometric view of a multiport valve assembly in accordance with an example embodiment of the present disclosure.

Multiport valves are typically used to transport sample materials to laboratory equipment for analysis. For example, multiport valves can be used to introduce liquid samples into ICP spectrometry instrumentation for analysis. Multiport valves can also be used to load samples on columns for liquid and/or gas chromatography. Typical valves used in these applications include six-port (6-port), two-position (2-position) rotary valves. Generally, two ports of a rotary valve are connected to an external (sample) loop, one port is connected to a sample source, another port is connected to a carrier source, a further port is connected to a vent (waste), and another port is connected to a nebulizer/column. When the valve is in a first orientation, sample from the sample source flows through the sample loop, while carrier from the carrier source flows directly to a nebulizer/column. When the valve is rotated to a second orientation, the carrier source is connected to the sample loop for injecting the sample contained in the sample loop into the nebulizer or onto the column.

For advanced valves having electronics associated with monitoring the flow paths through portions of the valve, coupling the electronics to the associated power sources, control logic, or the like is essential to the functionality of the valve. However, the electrical coupling is at risk of breaking during operation of a rotary valve, through the forces associated with turning the rotor with a powered actuator. For instance, when a rotary valve is coupled to an actuator, the actuator can turn the rotor, putting stress on any electrical connections between the rotary valve and any power sources, control logic, or the like, causing the coupling to disconnect or otherwise disabling any sensor functionality of the valve.

Accordingly, a multi-port rotary valve system with integrated optical sensors is disclosed. The multi-port rotary valve system includes a retainer portion coupled to a valve collar to facilitate stabilizing an electrical connection fed from electronics associated with the valve actuator or circuitry coupled thereto, through an actuator cap, and through the valve collar to couple with a sensor connection which is fed from the optical sensors and through the retainer portion. The retainer portion includes retainer pins (which in an example implementation includes two retainer pins) to couple to recesses/apertures formed by the valve collar (which in an example implementation includes two corresponding apertures to mate with the retainer pins). When the retainer portion is coupled to the valve collar, the retainer pins fit within the recesses/apertures of the valve collar and the electrical connection between the optical sensor connector and the power connector is made. The pins/apertures provide an anti-shear mechanism that causes the retainer portion to remain fixed with respect to the valve collar, allowing the electrical connection to be maintained while the rotor shaft can move the rotor with respect to the stator without decoupling the electrical connections.

The valve system further includes an optical sensor housing that supports two optical sensors disposed with respect to two fluid lines coupled to two ports of the multi-port rotor/stator assembly. The optical sensors function to detect fluid flowing within the fluid lines. The lines include fittings having grooves formed therein. The housing includes a body and a cover, each of which can include corresponding protrusions to mate with the grooves of the fittings to keep the fittings securely positioned within the housing during operation. The housing cover also includes grooves to hold the lines within the groves and between the housing cover and the optical sensors, to hold the lines securely during operation. The cover also facilitates operation of the optical sensors by limiting exposure of ambient light from reaching the sensors.

Example Implementations

FIGS. 1 through 9 illustrate features and methods for the multi-port rotary valve system with integrated optical sensor, in accordance with embodiments of the present disclosure. Referring now to FIG. 1, a rotary valve system 100 includes a rotary valve 110 actuated by an actuator 120. The rotary valve 110 includes one or more ports configured to receive one or more fluids. While the rotary valve 110 is shown as a 6-port valve, the valve is not limited to a 6-port configuration and can include various port configurations including, but not limited to, fours ports, five ports, six ports, seven ports, eight ports, nine ports, ten ports, eleven ports, twelve ports, and the like. FIG. 1 also shows a sensor housing 160 adjacent to the rotary valve. The sensor housing 160 may support one or more sensors disposed with respect to one or more fluid lines coupled to the ports of the rotary valve. By way of an example, FIG. 1 depicts optical sensors directed at the inlet/outlet of two ports. In other embodiments, the sensors may include capacitive sensors directed at the inlet/outlet of two ports. The actuator 120 attached to the rotary valve 110 may include a power connection fed from electronics or controls circuitry associated with the actuator 120. Apart from physical connection of the actuator 120 with the rotary valve 110, the power connection may need to connect with a sensor connection from the one or more sensors. In an embodiment, a control system (not shown) may drive the actuator to move the rotor of the rotary valve 110 based in part on the signal received from the one or more sensors via the sensor connection.

The rotary valve system 100 further includes an actuator cap 130 attached to the actuator 120. The actuator cap 130 may facilitate electrical and physical interconnection between the actuator 120 and the rotary valve 110. The rotary valve system also includes a valve collar 140 that may further facilitate electrical and physical interconnection between the rotary valve 110 and the actuator cap 130. A retainer portion 150 disposed between the valve collar 140 and the rotary valve 110 completes the electrical and physical interconnection between the rotary valve 110 and the actuator cap 130.

Figure 2:
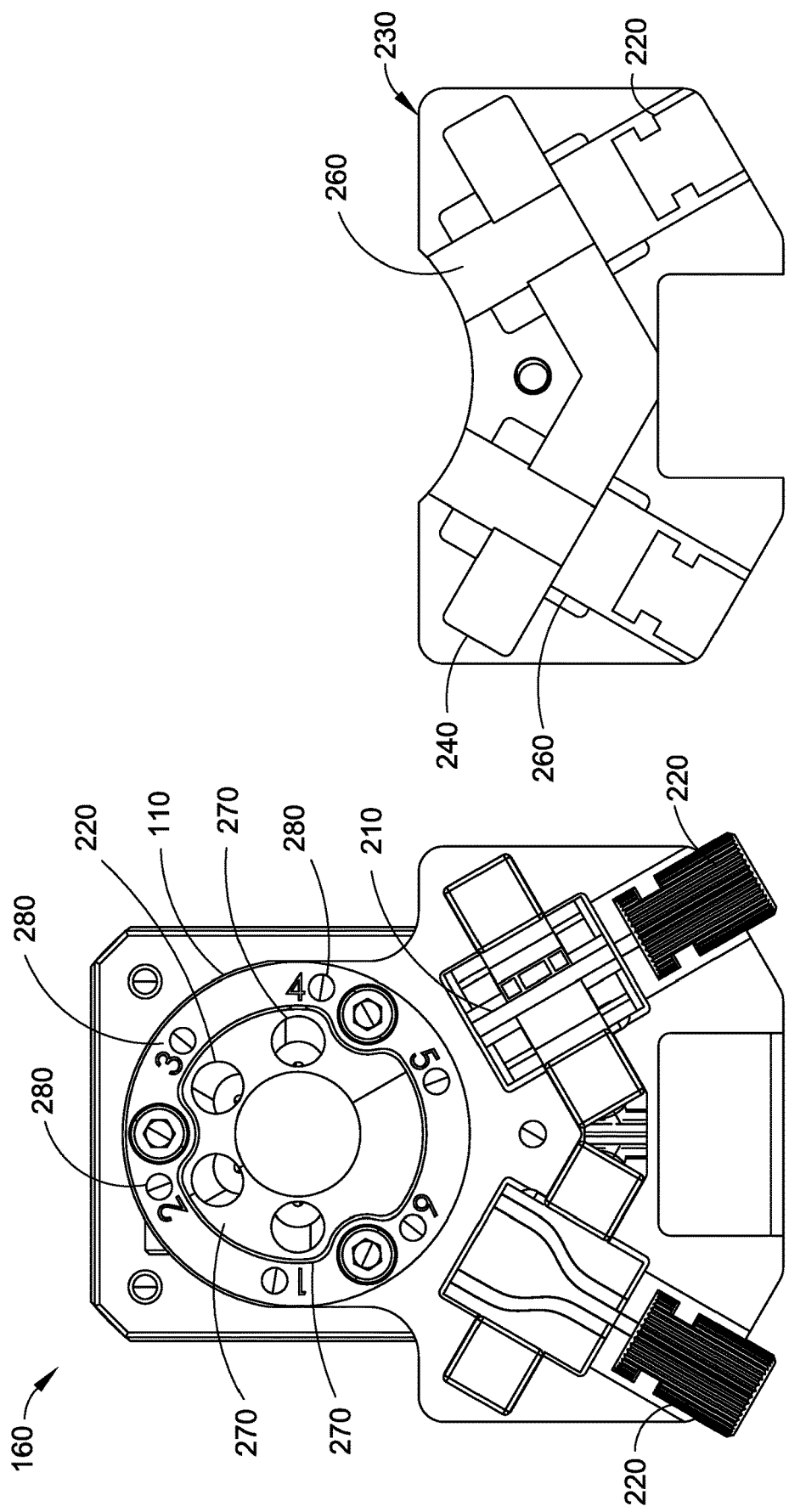
FIG. 2 is a partial diagrammatic illustration of the multiport valve assembly where an end piece showing a sensor housing, sensors and valve ports are described, in accordance with an example embodiment of the present disclosure.

Referring now to FIG. 2, an end piece showing a cross-section of the multi-port rotary valve 110 and the sensor housing 160 including sensors is illustrated. Valve ports 270 allow fluids to be passed in or out of the rotary valve 110. Attachment screws 280 may facilitate attachment of the rotary valve with the retainer portion 150. The sensor housing 160 may include one or more sensors 220 that may detect the presence of a sample in or relative to the rotary valve 110. In an example embodiment, the sensors may be optical sensors. In other embodiments, the sensors may be capacitive sensors. As shown in FIG. 2, by way of an example, optical sensors 220 may be attached to fluid lines 210 of ports 5 and 6 of the multi-port rotary valve 110. The sensor housing 160 includes a cover 230 that includes protrusions 240, 260 to mate with grooves in the fittings of the sensor housing 160 to keep the fittings securely positioned within the sensor housing 160 during operation. The sensor housing cover 230 also facilitates operation of the optical sensors 220 by limiting exposure of ambient light from reaching the sensors.

Figure 3:
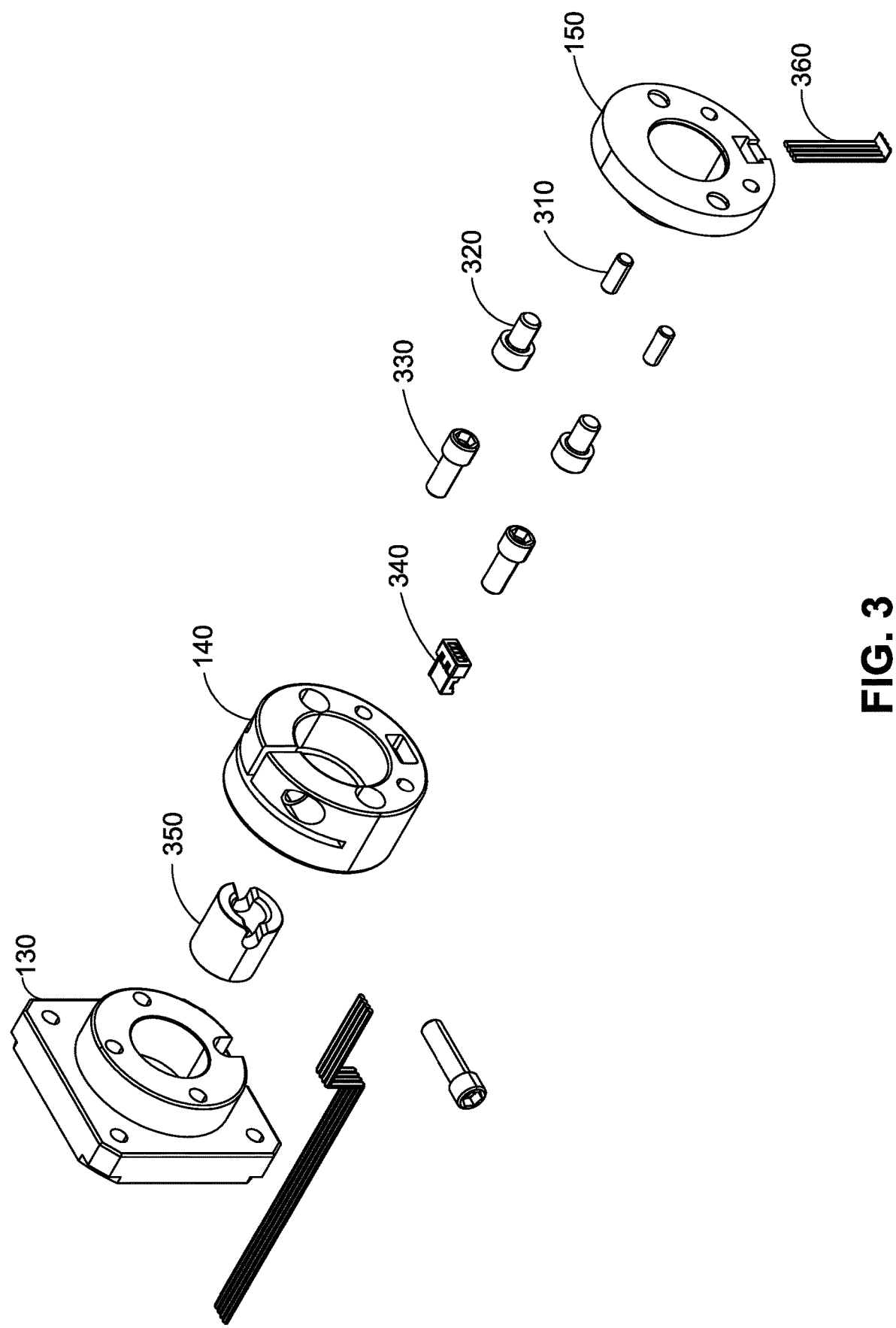
FIG. 3 is an exploded view of the multiport valve assembly showing an actuator cap, a valve collar, and a retainer portion and fasteners to attach them, in accordance with an example embodiment of the present disclosure.

Referring now to FIG. 3, an exploded view of a portion of the connection mechanism for the multi-port valve assembly 100 is illustrated. The actuator cap 130, the valve collar 140, and the retainer portion 150 are shown in the order (left to right) in which they are attached to the rotary valve 110. As indicated, the connection mechanism of FIG. 3 facilitates a power connection 360 to seamlessly pass through the actuator cap 130, the valve collar 140, and the retainer pin 150. An attachment mechanism 350 may facilitate attachment of the actuator cap 130 with the valve collar 140. An electrical connector 340 may be attached to the valve collar 140 and may facilitate connecting an electrical connection from the valve actuator 120 with a sensor connection from the sensors 220. Retainer pins 310 and fasteners 320 and 330 may facilitate mechanical connection between the valve collar 140 and the retainer portion 150.

Figure 4A:
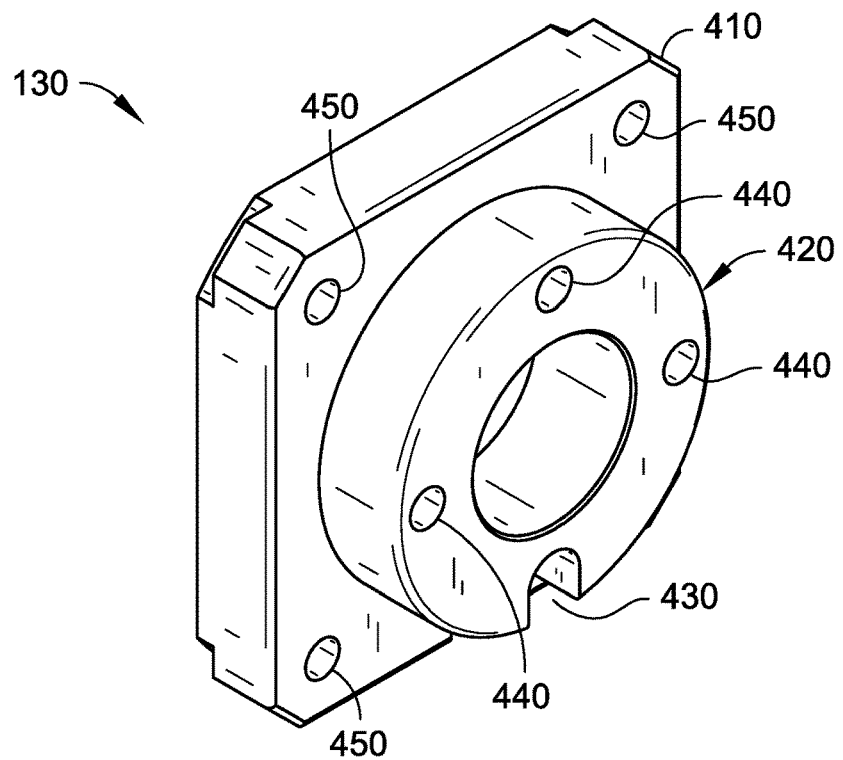
FIGS. 4A and 4B are front and back isometric views, respectively, of the actuator cap, in accordance with an example embodiment of the present disclosure.
Figure 4B:
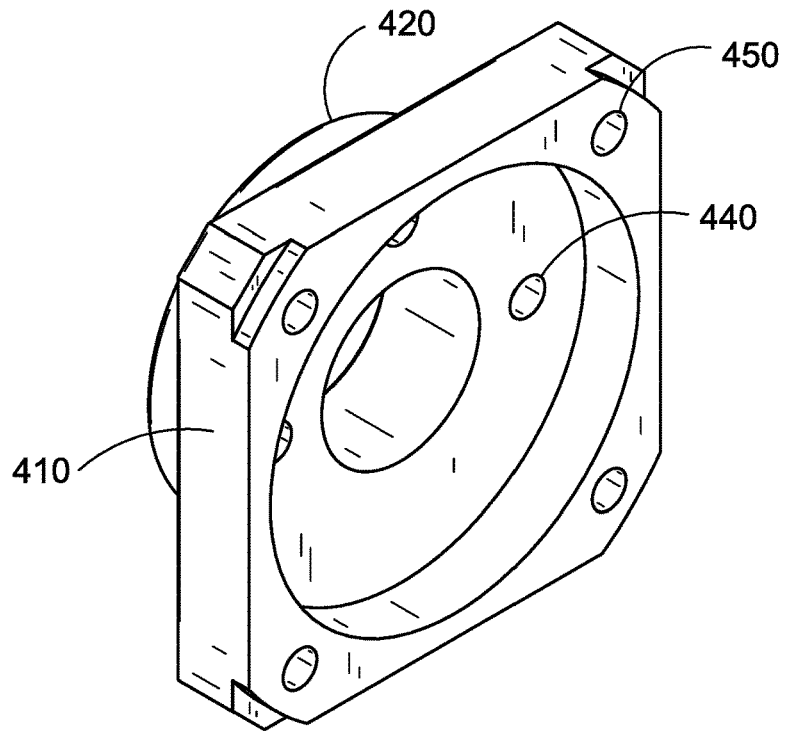

Referring now to FIGS. 4A and 4B, front and back isometric views, respectively, of the actuator cap 130 are illustrated. The actuator cap 130 includes a substantially rectangular portion 410 that is configured to mate with the valve actuator 120. The rectangular portion 410 includes apertures 450 to couple the actuator cap 130 to the actuator 120. The actuator cap further includes a substantially circular portion 420 that may be configured to couple to the valve collar 140. The circular portion 420 includes apertures 440 to couple the actuator cap 130 to the valve collar 140. The actuator cap further includes a recess 430 to facilitate a physical pathway for the power connection 360 to pass from the actuator 120 via the actuator cap 130 to the valve collar 140. Also, attachment mechanism 350 (not shown in FIGS. 4A and 4B) are used to secure the circular portion 420 of the actuator cap 130 with the valve collar 140.

Figure 5A:
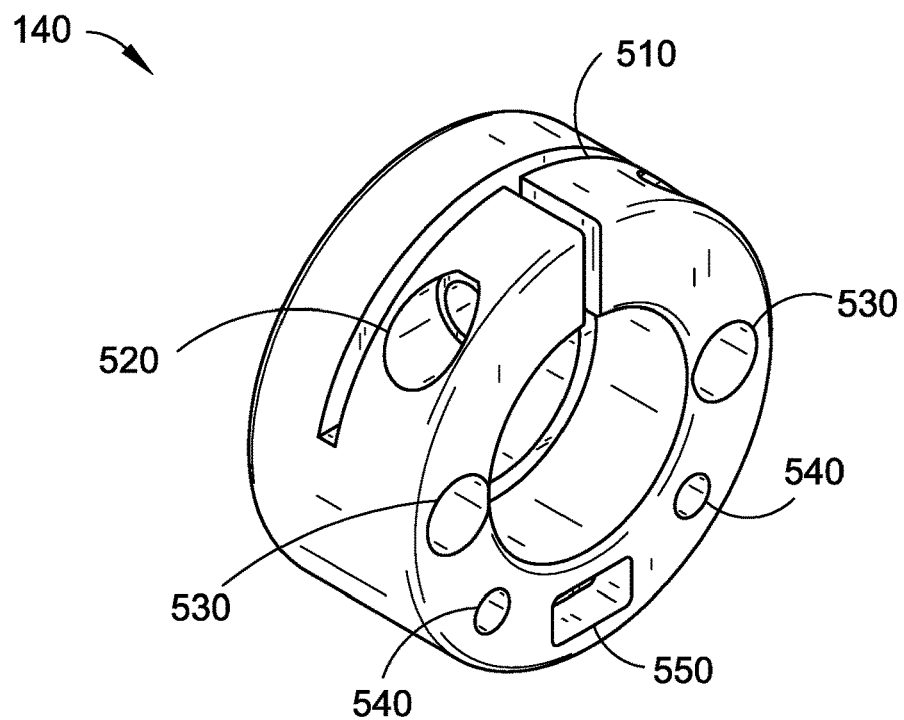
FIGS. 5A and 5B are front and back isometric views, respectively, of the valve collar, in accordance with an example embodiment of the present disclosure.
Figure 5B:
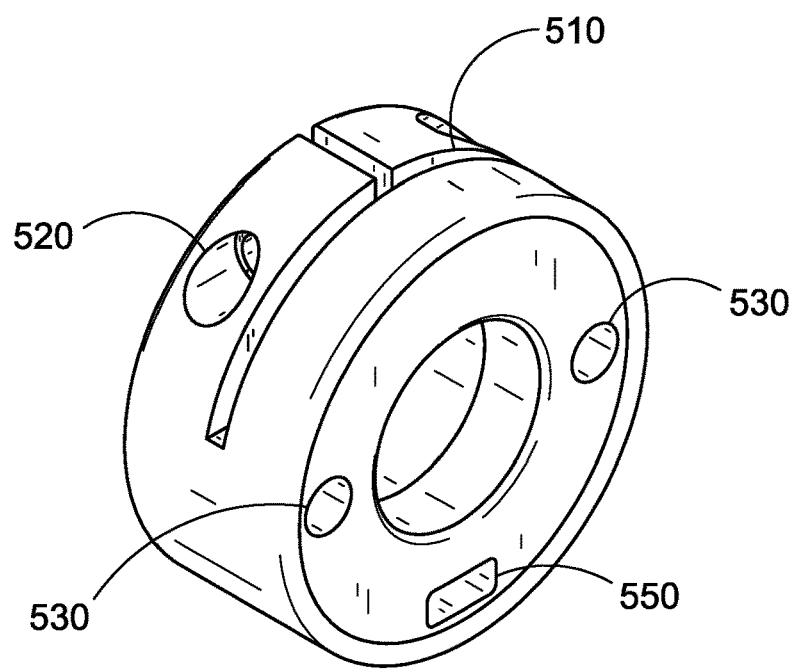

Referring now to FIGS. 5A and 5B, front and back isometric views, respectively, of the valve collar 140 are illustrated. The valve collar 140 includes recesses or apertures 530 formed to connect the valve collar 140 with the actuator cap 130 via one or more fasteners 330. The valve collar 140 also includes recesses 540 to mate the retainer pins 310 of the retainer portion 150 with the valve collar 140. A recess 510 provides a pathway for ease of access to fasteners that attach the valve collar 140 to the actuator cap 130 and the retainer portion 150. FIGS. 5A and 5B also illustrate a fastener opening 520 for a fastener to couple the valve collar 140 to the actuator cap 130 via the attachment mechanism 350 illustrated in FIG. 3.

Figure 6A:
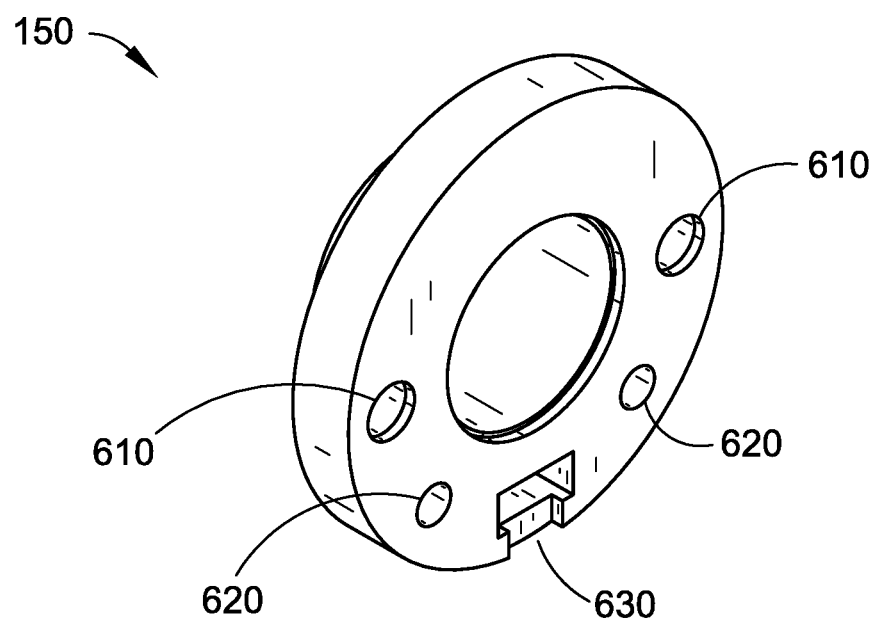
FIGS. 6A and 6B are front and back isometric views, respectively, of the retainer portion, in accordance with an example embodiment of the present disclosure.
Figure 6B:
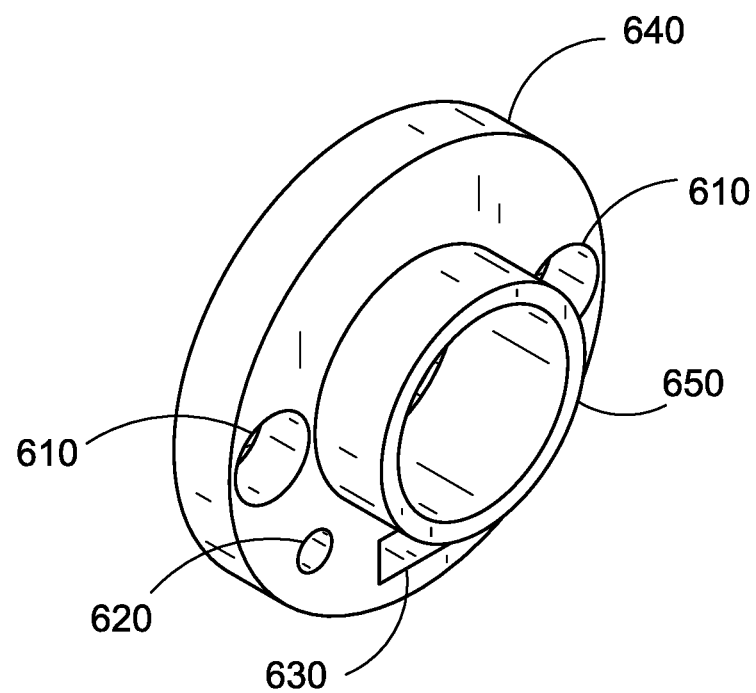

Referring now to FIGS. 6A and 6B, front and back isometric views, respectively, of the retainer portion 150 (without the retainer pins 310) are illustrated. The retainer portion 150 includes apertures 610 for attaching the retainer portion 150 to the rotary valve 110 via fasteners 320. The retainer portion 150 further includes apertures 620 for attaching the retainer portion 150 with the valve collar 140. When the retainer portion 150 is coupled to the valve collar 140, the retainer pins 310 provide a secure fit between apertures 540 of the valve collar 140 and apertures 620 of the retainer portion 150. Once this secure fit is established, power connection between an optical sensor connector (not shown) and the power connector 340 can be made. This arrangement of the retainer pins 310 and the apertures 540 and 620 may provide an anti-shear mechanism that causes the retainer portion 150 to remain fixed with respect to the valve collar 130, allowing the power connection to be maintained while the rotor shaft of the rotary valve 110 can move the rotor with respect to the stator without decoupling the electrical/power connections. FIGS. 6A and 6B also illustrate an electrical connection port for providing a pathway for the power connection or the sensor connection for the rotary valve system 100.

Figure 7:
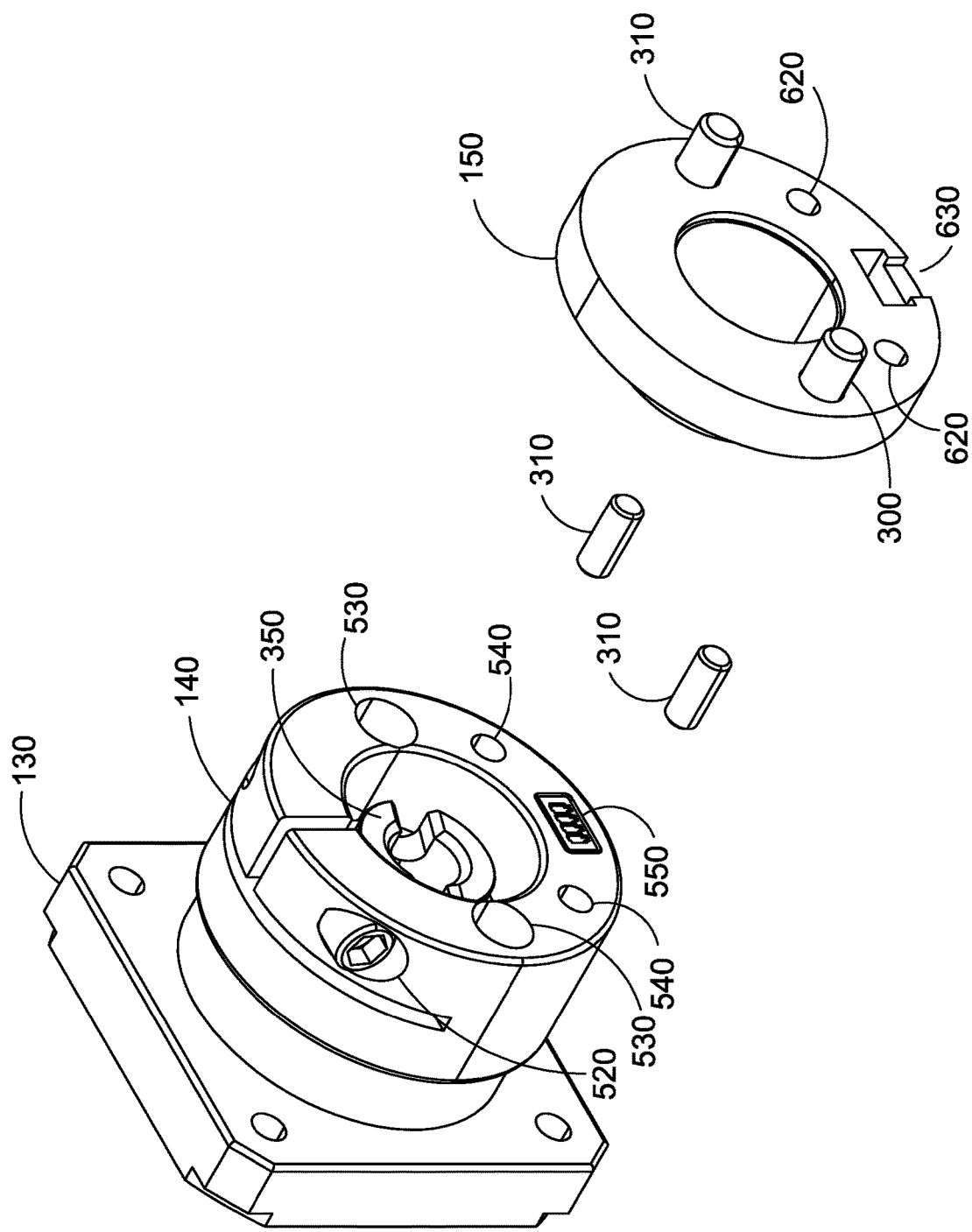
FIG. 7 is an exploded view of the actuator cap attached to the valve collar with unattached pins for the retainer portion, in accordance with an example embodiment of the present disclosure.

Referring now to FIG. 7, an exploded view of the actuator cap 130 attached to the valve collar 140 and the retainer portion 150 with unattached pins 310 is illustrated. The actuator cap 130 is attached to the valve collar 140 via the attachment mechanism 350. Also indicated in FIG. 7 is the fastener and aperture 520 for attaching the mechanism 350 with the valve collar 140. As further seen in FIG. 7, the exploded view of the actuator cap 130 attached to the valve collar includes passthrough passage 550 for power/electrical connection. The retainer portion 150 is illustrated with the retainer pins 310 removed. Also indicated in FIG. 7 are the apertures 620 for the retainer pins 310 and the passage 630 for the electrical/power connection 360 to passthrough.

Figure 8:
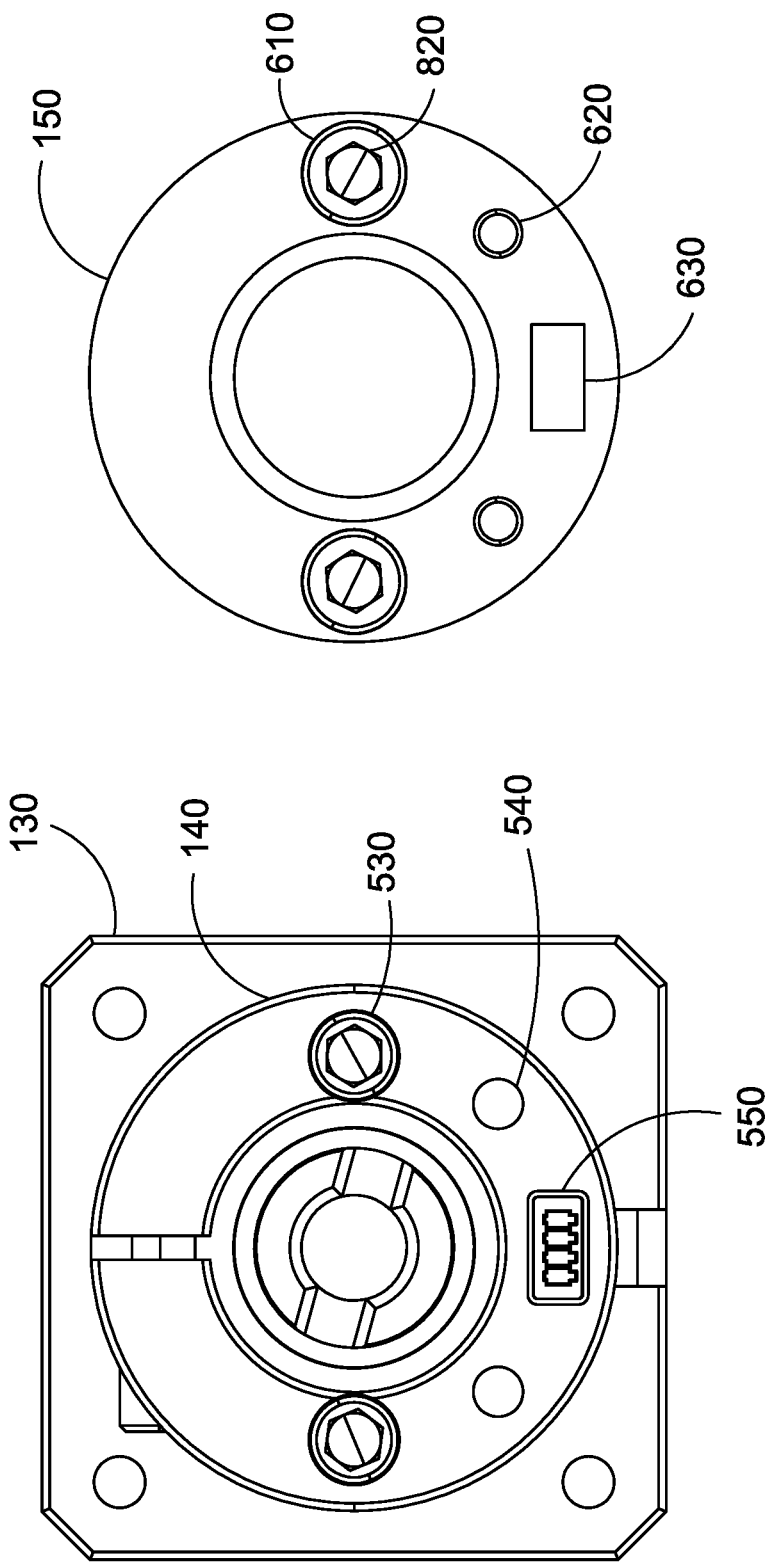
FIG. 8 is an end view of the actuator cap attached to the valve collar with pins attached to the retainer portion, in accordance with an example embodiment of the present disclosure.

Referring now to FIG. 8, an end view of the actuator cap 130 attached to the valve collar 140 and a cut away of the retainer portion 150 with the pins 310 attached is illustrated. The end view of FIG. 8 also shows apertures 530 with fasteners that facilitate attachment of the valve collar 140 to the actuator cap, as well as apertures 540 and 620 that facilitate attachment of the pins 310 to secure the valve collar 140 to the retainer portion 150. As indicated, the electrical connection port 550 of the valve collar 140 mates with the electrical connection port 630 of the retainer portion to provide a seamless pathway for electrical/controls connectivity between the valve actuator and the sensors inside the sensor housing 160.

It should be noted that while the terms "stator" and "rotor" are used herein to describe the first and second valve members, these terms are provided by way of example only (e.g., to illustrate how these components interface (e.g., rotate) with respect to one another), and are not meant to limit how the valve members can be actuated with respect to an external reference (e.g., valve mounting hardware, or the like). Thus, in one particular example, a component described as a "stator" may remain substantially stationary (e.g., with respect to an external reference, such as valve mounting hardware), and a component described as a "rotor" may rotate with respect to the stator. However, in another particular example, a component described as a "stator" may rotate with respect to a rotor, and a component described as a "rotor" may remain substantially stationary (e.g., with respect to valve mounting hardware). Further, in some implementations, both a component described as a "stator" and a component described as a "rotor" may rotate with respect to an external reference. It should also be noted that the terms "power connection" and "electrical connection"

may be used interchangeably to indicate electrical signals and controls signals to and from the actuator and the sensors.

Example Processes

The following discussion describes procedures that may be implemented in the multi-port rotary valve system with integrated optical sensors. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks.

Figure 9:
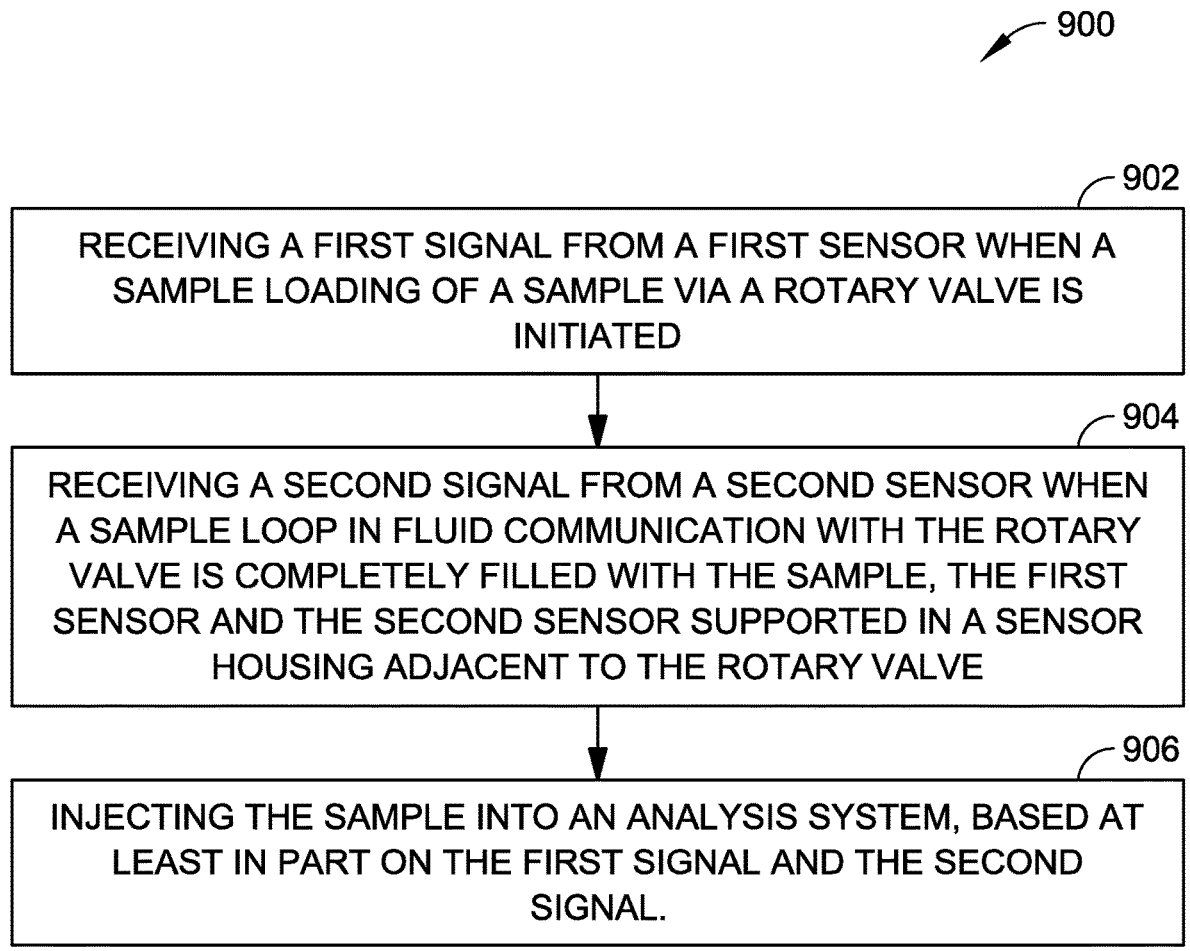
FIG. 9 illustrates a method for implementing the multi-port rotary valve system with integrated optical sensors for analyzing chemical samples, in accordance with an example embodiment of the present disclosure.

FIG. 9 illustrates a method 900 for implementing the multi-port rotary valve system with integrated optical sensors for analyzing chemical samples, such as the system 100 described above. The method 900 can include: receiving a first signal from a first sensor when a sample loading of a sample via a rotary valve is initiated (block 902); receiving a second signal from a second sensor when a sample loop in fluid communication with the rotary valve is completely filled with the sample, the first sensor and the second sensor supported in a sensor housing adjacent to the rotary valve (block 904); and based at least in part on the first signal and the second signal, injecting the sample into an analysis system (block 906).

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A valve system, comprising:
a rotary valve comprising one or more ports configured to receive one or more fluids;
an actuator attached to the rotary valve, wherein the actuator comprises a power connection fed from electronics associated with the actuator;
an actuator cap attached to the actuator, the actuator cap configured to allow the power connection to pass through, wherein the actuator cap comprises one or more apertures;
a valve collar with an integrated press-on connector configured to be attached to the actuator cap, wherein the valve collar comprises an electronic feedthrough passage for the power connection;
a retainer portion comprising one or more retainer pins, wherein the one or more retainer pins are configured to mate with the one or more apertures on the actuator cap, the retainer portion configured to allow electrical connection between the power connector and a sensor connector when the one or more retainer pins fit within the one or more apertures on the actuator cap; and
a sensor housing adjacent to the rotary valve and configured to support one or more sensors disposed with respect to one or more fluid lines coupled to the one or more ports of the rotary valve, the sensor connector configured to transmit signals from the one or more sensors to the actuator.

2. The valve system of claim 1, wherein the one or more sensors are optical sensors configured to detect the presence of a sample in or relative to the rotary valve.

3. The valve system of claim 1, wherein the one or more sensors are capacitive sensors configured to detect the presence of a sample in or relative to the rotary valve.

4. The valve system of claim 1, wherein the retainer portion comprises two retainer pins.

5. The valve system of claim 1, wherein the one or more retainer pins when coupled to the one or more apertures provides an anti-shear mechanism configured to allow the retainer portion to remain fixed with respect to the valve collar.

6. The valve system of claim 1, wherein the fluid lines comprise fittings having grooves formed therein.

7. The valve system of claim 1, wherein the sensor housing comprises a body and a cover, the body and the cover comprising protrusions to mate with the grooves of the fluid lines.

8. A valve system, comprising:
a multi-port rotary valve configured to receive one or more fluids;
an actuator attached to the multi-port rotary valve, wherein the actuator comprises a power connection fed from electronics associated with the actuator;
an actuator cap attached to the actuator, the actuator cap configured to allow the power connection to pass through, wherein the actuator cap comprises one or more apertures;
a valve collar with an integrated press-on connector configured to be attached to the actuator cap, wherein the valve collar comprises an electronic feedthrough passage for the power connection; and
a retainer portion comprising two retainer pins, wherein the two retainer pins are configured to mate with the two apertures on the actuator cap, the retainer portion configured to allow electrical connection between the power connector and a sensor connector when the two retainer pins fit within the two apertures on the actuator cap.

9. The valve system of claim 8, further comprising:
a sensor housing adjacent to the rotary valve and configured to support two sensors disposed with respect to two fluid lines coupled to two ports of the multi-port rotary valve, the sensor comprising the sensor connector configured to transmit signals from the two sensors to the actuator.

10. The valve system of claim 9, wherein the two fluid lines comprise fittings having grooves formed therein and wherein the sensor housing comprises a body and a cover, the body and the cover comprising protrusions to mate with the grooves of the two fluid lines.

11. The valve system of claim 9, wherein the two sensors are optical sensors configured to detect the presence of a sample in or relative to the multi-port rotary valve.

12. The valve system of claim 9, wherein the two sensors are capacitive sensors configured to detect the presence of a sample in or relative to the multi-port rotary valve.

13. The valve system of claim 8, wherein the two retainer pins when coupled to the two apertures provide an anti-shear mechanism configured to allow the retainer portion to remain fixed with respect to the valve collar.

14. The valve system of claim 8, wherein the fluid lines comprise fittings having grooves formed therein.

15. The valve system of claim 8, wherein the sensor housing comprises a body and a cover, the body and the cover comprising protrusions to mate with the grooves of the fluid lines.

\* \* \* \* \*